United States Patent [19]

Andrews et al.

[11] Patent Number: 5,333,133
[45] Date of Patent: Jul. 26, 1994

[54] CALL PROCESSING CONTROL SYSTEM

[75] Inventors: G. Wayne Andrews, Dunstable; Jeffrey A. Fried, Somerville; Jerry Gechter, Lincoln; Norvel L. Patton, Jr., Burlington, all of Mass.

[73] Assignee: Teloquent Communications Corporation, Billerica, Mass.

[21] Appl. No.: 875,069

[22] Filed: Apr. 28, 1992

[51] Int. Cl.$^5$ .......................... H04M 3/56; H04L 5/18
[52] U.S. Cl. ..................................... 370/58.2; 370/62; 379/88; 379/158; 379/210
[58] Field of Search ....................... 370/62, 58.1–58.3, 370/110.1; 379/210–212, 265, 266, 67, 88, 158

[56] References Cited

U.S. PATENT DOCUMENTS

| | | | |
|---|---|---|---|
| 4,573,140 | 2/1986 | Szeto | 364/900 |
| 4,663,777 | 5/1987 | Szeto | 379/88 |
| 4,763,353 | 8/1988 | Canale et al. | 379/67 |
| 4,893,328 | 1/1990 | Peacok | 379/265 |
| 4,979,206 | 12/1990 | Padden et al. | 379/67 |
| 4,980,908 | 12/1990 | Yu | 379/67 |
| 5,003,575 | 3/1991 | Chamberlin et al. | 379/89 |
| 5,020,095 | 5/1991 | Morganstein et al. | 379/266 |
| 5,023,868 | 6/1991 | Davidson et al. | 370/58.1 |
| 5,036,535 | 7/1991 | Gechter et al. | 379/265 |
| 5,062,103 | 10/1991 | Davidson et al. | 370/58.1 |
| 5,134,647 | 7/1992 | Pugh et al. | 379/88 |
| 5,168,515 | 12/1992 | Gechter et al. | 379/265 |

OTHER PUBLICATIONS

Luhmann, Rick, "IVR Trends", Interactive Voice Response, Teleconnect, Sep. 1991, pp. 106, 108–112.

Primary Examiner—Wellington Chin
Assistant Examiner—Chau T. Nguyen
Attorney, Agent, or Firm—Fish & Richardson

[57] ABSTRACT

A control system for processing calls comprising a call handling device and a device controller that are each connected to a network via a call connection interface that permits establishing and releasing a network connection, participation with another call connection interface in the same network connection, and either control over a network connection when the interface is the sole interface participating in that connection or control over a network connection to drop the last leg added to a network connection, the device controller and call handling device sending messages to each other over a message transfer interface. Also disclosed are a system for shifting control of a network connection and a system for monitoring the state of a network connection from a network interface that is not actively engaged in the network connection.

98 Claims, 12 Drawing Sheets

| Network | Device Controller 14 | VRU 16 |
|---|---|---|

Establish call leg to VRU

Hold

Call arrival

Conference (add leg to VRU)

Hold conference

Play announcement

Digits

Announcement done

Call out to agent

Hold agent call

Retrieve conference

Drop leg (check if caller still there)

Transfer

Disconnected

Disconnect Ack.

CALL PROCESSING CONTROL SYSTEM

BACKGROUND OF THE INVENTION

The invention relates to a control system for processing calls.

Many electronic devices are available for connection to a telephone line to provide automated voice and other functions. E.g., a voice response unit can be used to allow callers to enter touch tone digits in response to recorded prompts so as to direct the call to an appropriate class of answering agents. Typically these devices connect to telephone networks with ordinary analog connections or with T1 digital connections. Both of these interfaces provide limited flexibility for call control interaction with the network. In particular, transferring of calls, when possible at all, incurs the delay of switch hook manipulation and outdialing before transfer can take place.

Davidson et al. U.S. Pat. No. 5,062,103 describes a system in which the integrated services digital network (ISDN) shared call appearance feature is used so that a controller can obtain information from the switch as to whether an agent is busy or not so as to identify available agents to which calls can be forwarded for handling.

SUMMARY OF THE INVENTION

In one aspect, the invention features, in general, a control system for processing calls that includes a call handling device (e.g., a voice response unit) and a device controller. The call handling device and the device controller are each connected to a network via a call connection interface that permits establishing and releasing a network connection and participation with another call connection interface in the same network connection. The interface to which the device controller is connected additionally permits control over a network connection when it is the sole interface participating in that connection. These capabilities can be provided, e.g., by shared call appearances. The call handling device and the device controller communicate to each other via message transfer interfaces, the device controller sending control messages to the call handling device regarding establishing and/or releasing the network connection. A particular application for the invention is when the call handling device is connected to the network via an interface that has limited call handling functionality, and the device controller is connected to the network via an interface that has more extensive call handling functionality. In this case, the call handling device might preliminarily handle the call, e.g., to obtain information, and the device controller could instruct the call handling device to release control and thereafter take over handling of the call. With this approach, additional functionality is provided for calls processed by the call handling device; e.g., call transfer can be provided for calls processed by a voice response unit connected to an analog line that does not have call transfer capability or the ability to do so efficiently.

In another aspect, the invention features, in general, a control system for processing calls that includes a call handling device and a device controller. The call handling device and the device controller are each connected to a network via a call connection interface that permits establishing and releasing a network connection and participation with another call connection interface in the same network connection. The interface through which the device controller is connected additionally permits control over the network connection to drop the last leg added to the network connection. These capabilities can be provided, e.g., by call conferencing. The call handling device and the device controller communicate with each other over message transfer interfaces, e.g., to permit the call handling device to communicate information that may have been received from the caller, and to permit the call handling device and the device controller to coordinate actions. The device controller can exercise direct control over the connection by a control message to the network regarding dropping the last leg added to the network connection. The drop feature can also be used to determine if the outside caller has hung up. If the call handling device was the last leg added, the drop command drops the call handling device, and the device controller and the outside caller remain. If, on the other hand, the caller has hung up, the drop command causes the network to release the connection. This feature can be advantageously used to confirm that the outside caller is still on the connection before taking steps to transfer the outside caller to another terminal (e.g., agent station) after the call handling device has completed its interaction with the outside caller.

In some preferred embodiments the device controller and the call handling device can be implemented on different platforms, which may or may not be remotely located from each other. In this case the message transfer interfaces can be to the same network as the one over which calls are received or to a different network. Alternatively, the message transfer interfaces can be to a direct communication link between the controller and device.

In some other preferred embodiments, the controller and device are implemented on the same platform, and the communication can be over internal message transfer interfaces.

The network over which calls are received can be a public network to which the controller is connected via an ISDN interface and to which the device is connected via an analog line, an ISDN interface, or a T1 line (where available). The network can alternatively be a private network, and the shared call appearance can be provided between propriety PBX sets or can be provided between PBX sets and analog, ISDN, or T1 lines. The network over which calls are received can be a voice or data network.

In another aspect, the invention features, in general, a system for shifting control of a network connection from one network interface to another. The system includes two or more terminal devices connected via respective network interfaces to the same network connection. Each network interface permits establishing and releasing a network connection, participation with the other network interface in the same network connection, and control over a network connection when the network interface is the sole network interface participating in that connection. These capabilities can be provided, e.g., by shared call appearances. The two terminal devices are connected to communicate with each other by transmitting control messages relating to the network connection via a message transfer interface. In this way, the two terminals can coordinate their actions via the message transfer interface, and one terminal device can release a network connection, thereby giving control over the connection to the other terminal device.

In another aspect, the invention features, in general, a system for monitoring the state of a network connection from an interface that is not actively engaged in that connection. The system includes two terminal devices connected via respective network interfaces to the same network connection. Both interfaces permit establishing and releasing a network connection and participation with another network interface in the same network connection. At least one of the interfaces additionally permits control over the network connection to drop the last leg added to the network connection, and the terminal device connected to that interface is programmed to determine the state of the network connection via sending a drop message to the network to drop the last leg added to a network connection. These interface capabilities can be provided, e.g., by call conferencing.

Other advantages and features of the invention will be apparent from the following description of the preferred embodiments thereof and from the claims.

DESCRIPTION OF THE PREFERRED EMBODIMENTS

Drawings

Structure

Figure 1:
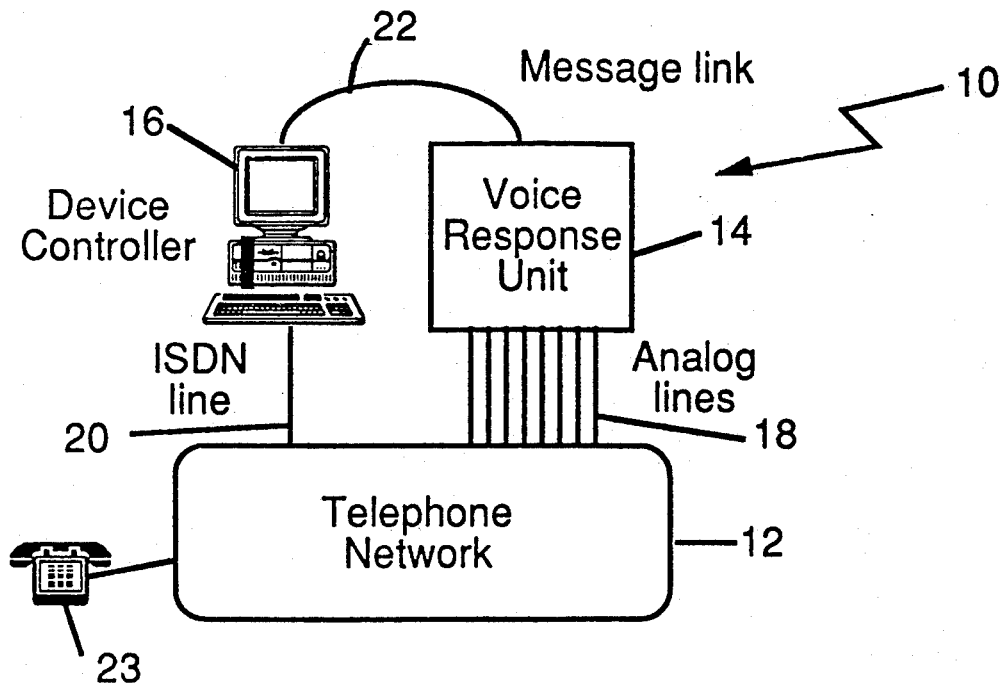
FIG. 1 is a block diagram of a system for processing calls according to the invention.

Referring to FIG. 1, there is shown system 10 for processing calls placed over telephone network 12. System 10 includes voice response unit 14 and device controller 16.

Voice response unit 14 is connected to telephone network 12 via a plurality of analog lines 18. Voice response unit 14 receives incoming telephone calls over analog lines 18, plays voice messages and prompts, and receives touch tone responses from callers. Voice response unit 14 is, for example, an Infobot available from Syntellect, Inc., Phoenix, Ariz.

Device controller 16 is a personal computer, e.g., model Premium II 486/33 available from AST Research, that has an ISDN interface card (e.g., PC53 available from DGM&S, Inc., Mt. Laurel, N.J.) and is connected to telephone network 12 via ISDN line 20. The software implementing the device controller may be executed either on the ISDN interface card or on the computer itself.

Analog lines 18 provide a call connection interface that may not permit call transfer but does permit the voice response unit to engage and disengage a telephone call. The lines also permit a shared call appearance with ISDN line 20, or receipt of a conferenced call from ISDN line 20. Voice response unit 14 and device controller 16 communicate over direct message transfer link 22, voice response unit 14 sending informational messages to device controller 16, and device controller 16 sending control messages to voice response unit 14. Device controller 16 is connected to network 12 via an ISDN interface that does permit it to transfer telephone calls received over the network to another telephone, e.g., telephone 23. The ISDN interface serves as a call connection interface. Reference is made to Gechter et al. U.S. Pat. No. 5,036,535 and Davidson U.S. Pat. No. 5,062,103 (both hereby incorporated by reference) and the references cited therein for discussion of the ISDN and the transfer call and shared call appearance features thereof.

Figure 2:
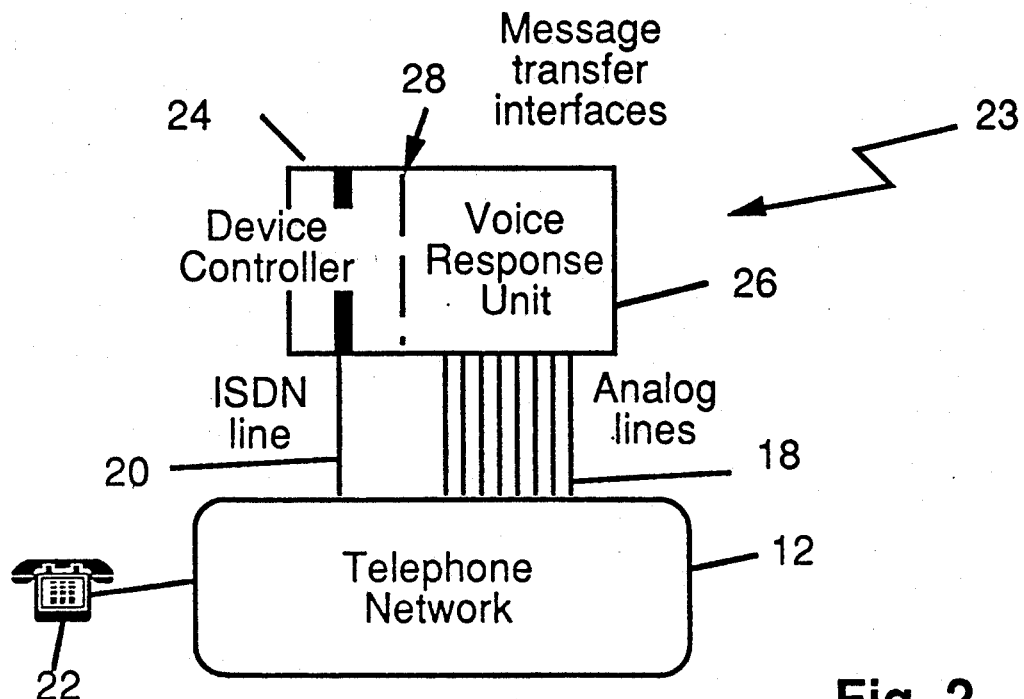
FIG. 2 is a block diagram of an alternative embodiment of a system for processing calls according to the invention.

Referring to FIG. 2, in system 23, device controller 24 and voice response unit 26 are part of the same physical equipment, for example, a personal computer with cards inserted for the device controller function and the ISDN interface function. In this case, communication between device controller 24 and voice response unit 26 is by internal message transfer interfaces 28 rather than by an external physical link.

Figure 3:
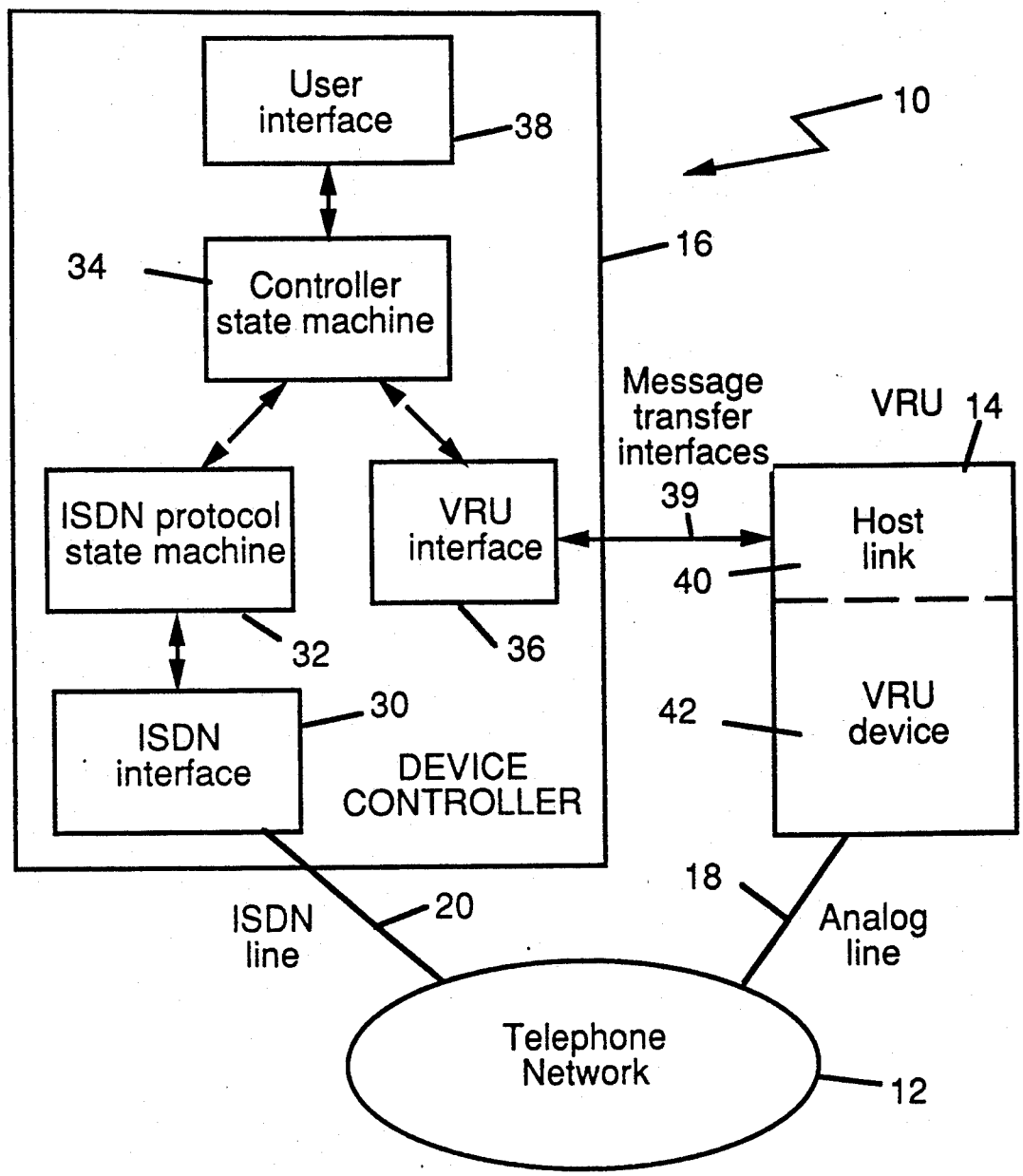
FIG. 3 is a block diagram of the software architecture for the FIG. 1 system.

Referring to FIG. 3, there is shown the software architecture for call processing system 10. Device controller 16 includes the following functional modules: ISDN interface module 30, ISDN protocol state machine module 32, controller state machine module 34, voice response unit interface module 36 and user interface module 38. Events from ISDN line 20 and from voice response unit 14 are inputs to overall controller state machine 34. Configuration of device controller 16 is performed by user interface module 38. Management of voice response unit 10 by device controller 16 takes place over message transfer interfaces 39 linking the two control functions.

Within voice response unit 14, host link software 40 enables voice response unit device 42 to communicate with and to take action based upon interaction with device controller 16. Host link software 40 configures voice response unit 14 to implement the control protocol used for communication with device controller 16.

The transmission of informational messages and control messages between device controller 16 and voice response unit 14 can take place over different types of data interfaces, including those internal to a physical unit (as in FIG. 2) and those between physical units (as in FIG. 1). The informational and control messages can be transmitted using the X.25 service of the ISDN network itself; in this case, instead of one or more of the analog lines 18, there would be an ISDN line supporting multiple call appearances or call conferencing, and the logical connection labelled message transfer interfaces 39 would take place over the physical ISDN connection to the telephone network.

Call appearances on an ISDN line are logical control channels for management of particular calls on that line. With the ISDN, a call appearance can be "shared"

between an analog line and an ISDN line, a feature known as shared call appearance (see discussion in AT&T 5 ESS Switch, ISDN Basic Rate Interface Specification, 5E6 Generic Program Document 235-900-321 or Bellcore ISDN Electronic Key Telephone Service Technical Reference TR-TSY-000205). The features of shared call appearances are described as follows. If A and B share a call appearance, A can do anything to the call if B does not pick it up, and B will be able to watch all activity of A on the call appearance. If both A and B are connected to the call, they cannot hold, transfer or conference; moreover, drop/disconnect by A or B only disengages the dropper but does not drop the call, and neither A nor B can tell if the other is engaged or not. A particular limitation of a shared call appearance is that an ISDN line sharing a call appearance with an analog line cannot transfer a shared call which is active on that analog line.

With call conferencing, a second party can be added to a call. E.g., if a call comes in to A, B can be added to participate in the call through the conferencing feature. A can then place itself on hold and permit B to be the sole party communicating with the outside call. However, in this case A will not receive an indication if one of the two parties (e.g., the caller) disconnects the call. The Drop service, which disconnects the last added leg, is used to provide this information. If the caller has hung up, the Drop service will disconnect the network connection; otherwise the Drop service merely removes the leg to B. The call conferencing and Drop service are, e.g., as described in AT&T 5ESS document referenced earlier.

In system 10, informational messages and control messages passed over message transfer link 22 allow device controller 16 and voice response unit 14 to coordinate their activities, and this coordination extends the capabilities of shared call appearances or call conferencing to provide complete control of voice response unit 14 and permit transfer of calls handled by it, even though calls cannot be transferred from an analog line 18. The message interface protocol described in FIG. 8 and illustrated in FIGS. 4-7 provides this call processing control using shared call appearances in spite of the limitations of analog lines and the shared call appearance function. Similarly, the message interface protocol described in FIG. 14 and illustrated in FIGS. 9-13 provides this call processing control using call conferencing in spite of limitations of analog lines and the call conferencing function.

Operation

Referring to FIGS. 4-8, the processing of a telephone call from caller 44 using the shared call appearance function is shown in four steps. On FIGS. 4-7, ISDN call appearances 46, 48 are shown short horizontal lines extending from device controller 16, and physical analog lines 18 are shown as short horizontal lines extending from voice response unit 14. Call appearances 46 correspond one-to-one with analog lines 18 connected to voice response unit 10. Call appearances 48 are independent of voice response unit 14 and are used to manipulate calls on the ISDN line. Messages between voice response unit 14 and device controller 16 are shown as the arrows extending vertically between the two. On FIG. 8, the message interface protocol shows both the messages between VRU 14 and device controller 16 and the communications of VRU 14 and device controller 16 with the network over the call connection interfaces.

Figure 4:
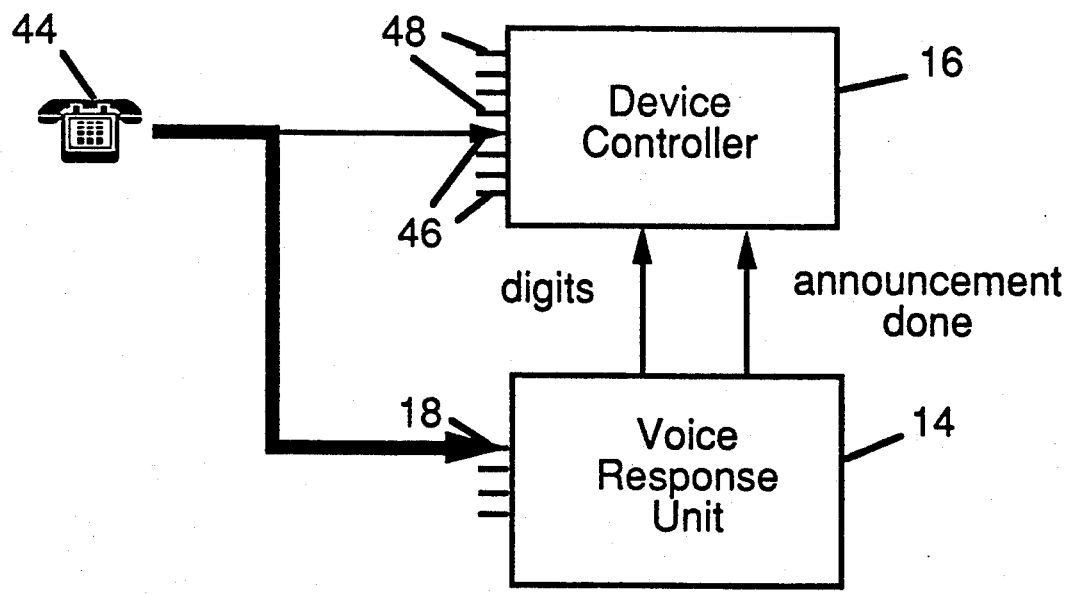
FIGS. 4-7 are diagrams illustrating steps in the processing of calls by the FIG. 1 system when employing shared call appearances.

FIG. 4 shows caller 44 interacting with voice response unit 14, the first step. Caller 44 is shown associated with both a line 18 to voice response unit 14 and the corresponding shared call appearance 46 of the ISDN line connected to device controller 16. Voice response unit 14 is actively connected to the call, as is indicated by the heavy line from caller 44 to it on FIG. 4. During this first step, the ISDN line is not connected to caller 44, so device controller 16 can monitor the state of the analog line and be directly informed if caller 44 hangs up. In this state, the diagram shows information messages between device controller 16 and voice response unit 14 relating to the digit collection function of voice response unit 14. Voice response unit 14 plays the message and receives touch-tone digits from caller 44 in response to the message. Voice response unit 14 then communicates the digits to device controller 16 and indicates when the announcement or other interaction with caller 44 has been completed.

Figure 5:
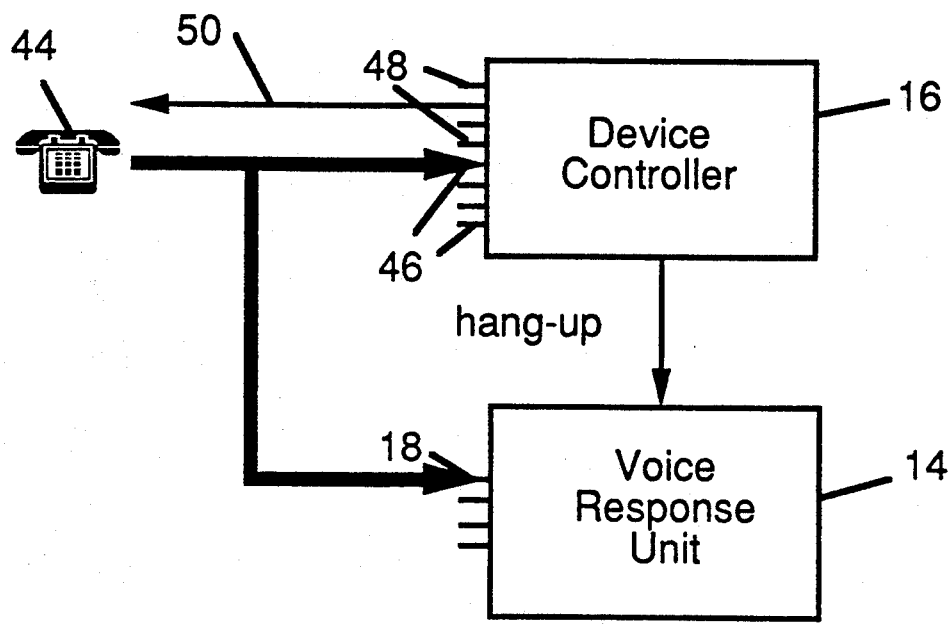

In FIG. 5, device controller 16 is shown preparing to transfer the call away from voice response unit 14, something that unit 14 is incapable of doing efficiently or at all on its own, owing to the limited functionality of analog lines 18. Device controller 16 initiates an outgoing call to the eventual destination of the call from caller 44. This is shown by outgoing arrow 50 from an unshared call appearance 48 at device controller 16. This speeds up the process of transfer because the outgoing leg will be ready as soon as the call is in a state in which it can be transferred. Device controller 16 then connects to the call from caller 44 via the shared call appearance, permitting it to eventually exercise control over the call from caller 44. (This is shown by the heavy line to controller 16 on FIG. 5.) Next device controller 16 sends a control message, via the message transfer interface, to voice response unit 14 telling the latter to hang up on the call.

Figure 6:
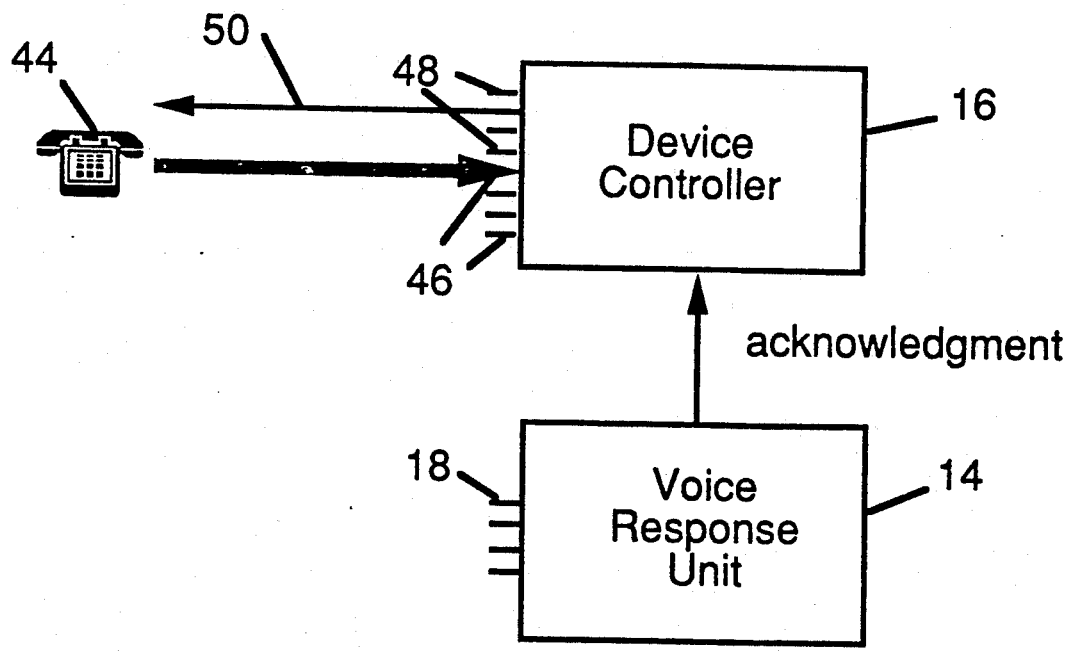

In FIG. 6, voice response unit 14 is shown after having hung up so that the call appearance at device controller 16 is the only connection to caller 44. After voice response unit 14 has disconnected, it informs device controller 16 that is has done so via an acknowledgment message passed over the message transfer interface. Once device controller 16 receives this message, it knows that it has sole control of the call from caller 44 and hence has the power to transfer the call. Device controller 16 then issues a call transfer message to network 12 directing that the (incoming) call from caller 44 on the shared call appearance 46 be transferred to (outgoing) call 50 on the unshared call appearance 48.

Figure 7:
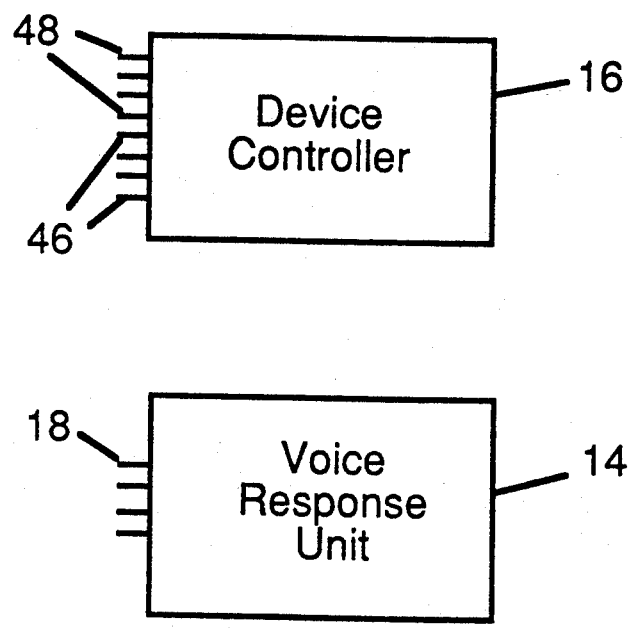
Figure 8:
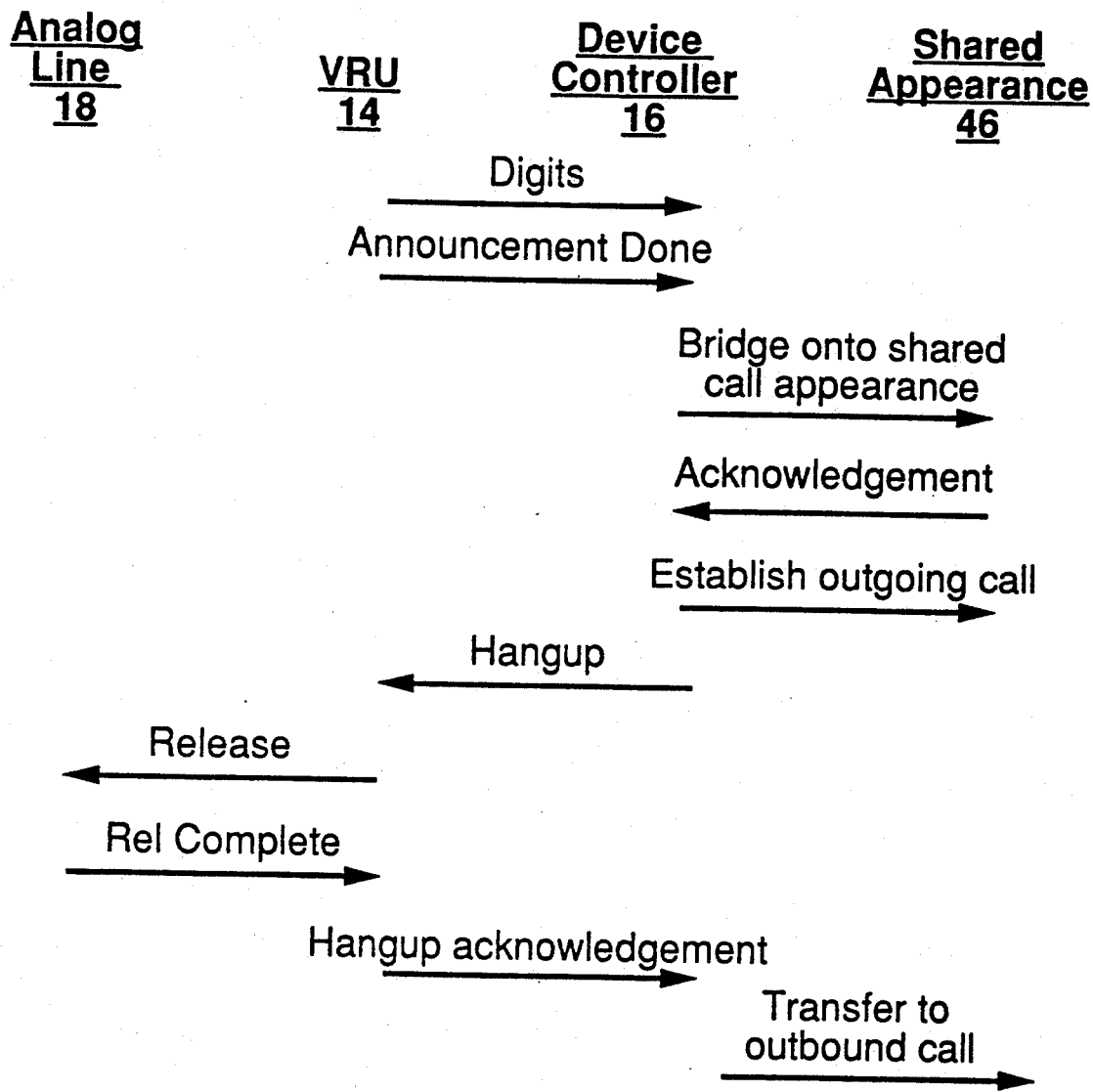
FIG. 8 is a diagram describing the protocol for the call processing illustrated in FIGS. 4-7.

FIG. 7 shows the result. Caller 44 is now connected to the destination of the outgoing call, and neither device controller 16 nor voice response unit 14 has anything to do with the call. By the combination of the shared call appearance feature and the device controller/voice response unit protocol, ISDN call transfer has been performed following receipt of information from a caller by a voice response unit connected to an analog line.

Figure 9:
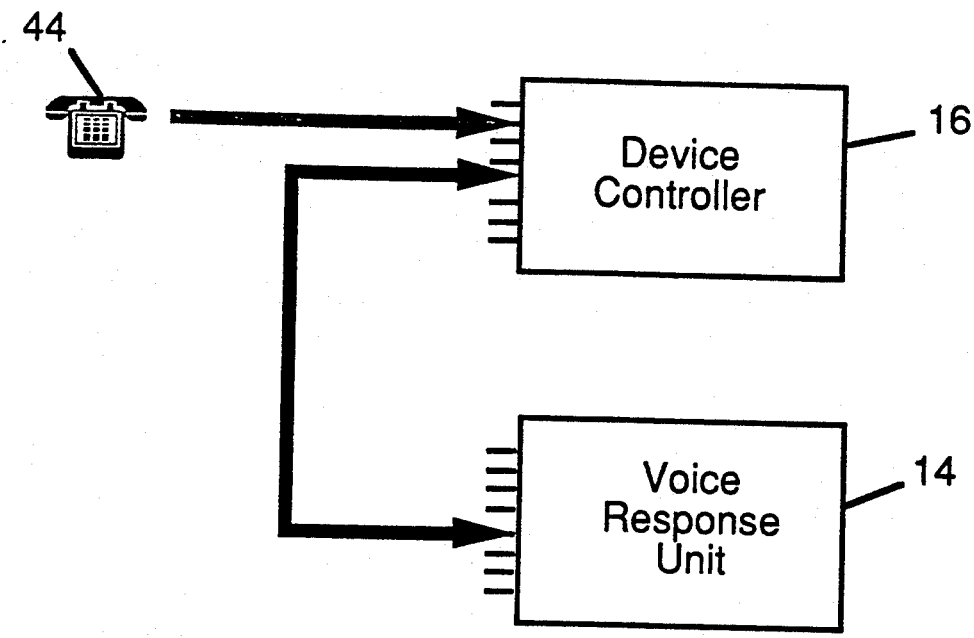
FIGS. 9-13 are diagrams illustrating steps in the processing of calls by the FIG. 1 system when employing call conferencing.

Referring to FIGS. 9-14, the processing of a telephone call from caller 44 using the call conferencing function is shown in four steps. FIG. 9 shows the initial step. An incoming call is made from caller 44 to device controller 16. In preparation of establishing a conference with voice response unit 14, device controller 16 sends a message to the network to establish a call leg to the voice response unit. Device controller 16 then requests the network to place the voice response unit leg on hold. When the call from caller 44 arrives, the network sends a message to device controller 16 indicating that the call has arrived. Device controller 16 then requests the network to conference the leg to voice response unit 14 and the call from caller 44 and to place itself on hold, as indicated on FIG. 14.

Figure 10:
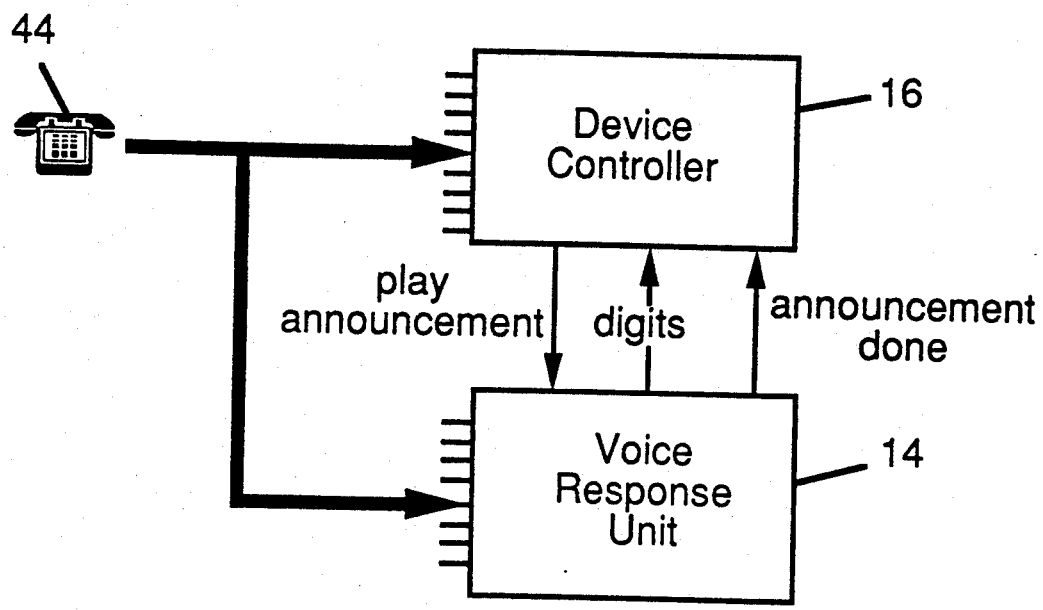

Referring to FIG. 10, device controller 16 sends, via the message transfer interfaces, a control message to voice response unit 14 instructing it to play an announcement. Voice response unit 14 plays the announcement to caller 44 and receives touch-tone digits from caller 44 in response to the message. The digits are then communicated to device controller 16 along with an announcement done message.

Figure 11:
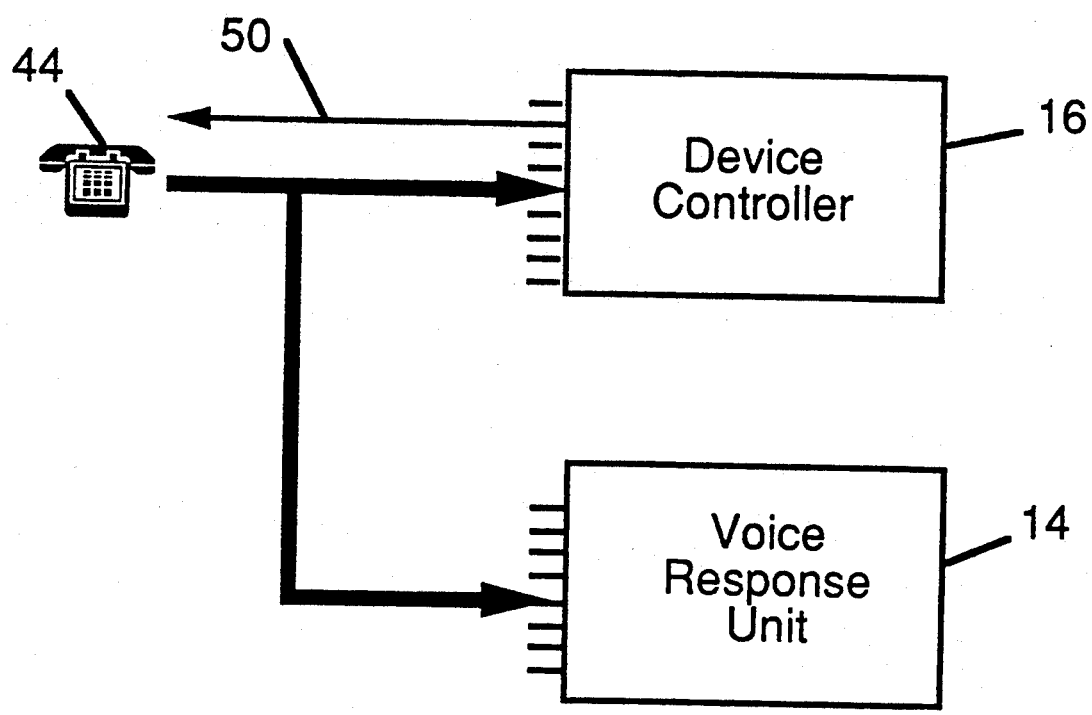

Referring to FIG. 11, device controller 16 then places a call to the eventual destination of the call from caller 44, as indicated by arrow 50 on FIG. 11. The eventual destination could be an agent. Before the call is transferred, device controller 16 must check that caller 44 did not hang up while connected to voice response unit 14. It does this by issuing a Drop message to the network. This disconnects the last leg added to the call. Normally, this will disconnect voice response unit 14, so that the connection from caller 44 to device controller 16 remains. If caller 44 has hung up, the Drop message will cause the network to release the network connection, so no transfer need take place.

Figure 12:
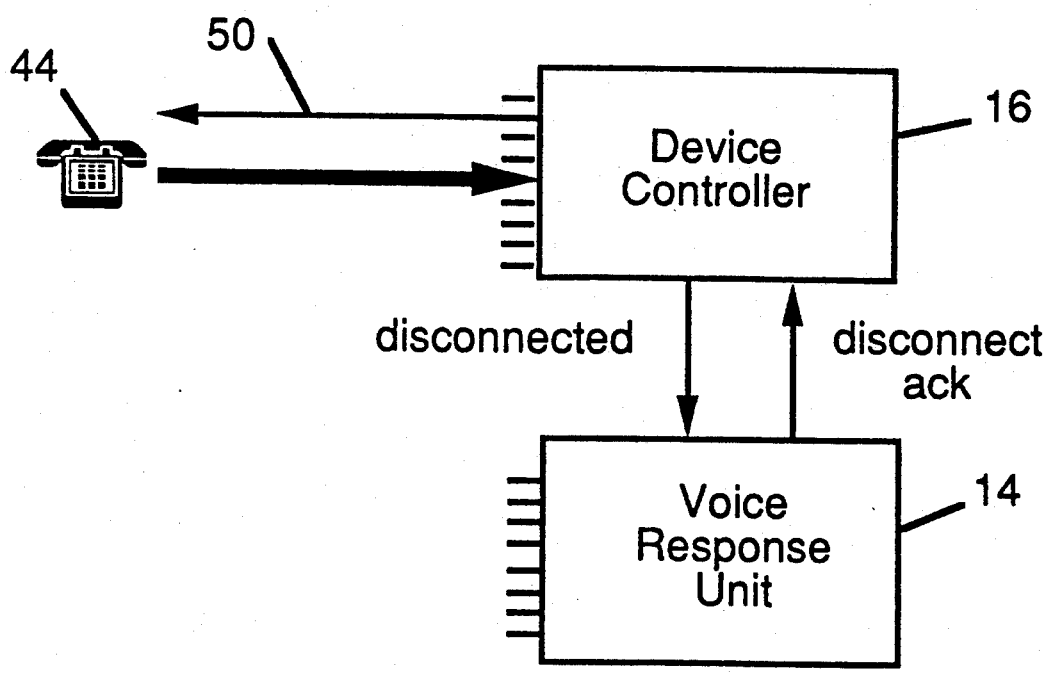

Referring to FIG. 12, assuming that the caller has not hung up, voice response unit 14 will have been disconnected by the Drop message but may not necessarily know that it has been disconnected and is free to take another call. Accordingly, device controller 16 sends a "disconnected" message, via the message transfer interface, to voice response unit 14, instructing the latter that it has been disconnected. Voice response unit 14 then sends a "disconnect acknowledge" message to device controller 16. The leg to device controller 16 is the only connection to caller 44. Device controller 16 issues a call transfer message to network 12 requesting that the incoming call from caller 44 be transferred to the outgoing leg 50.

Figure 13:
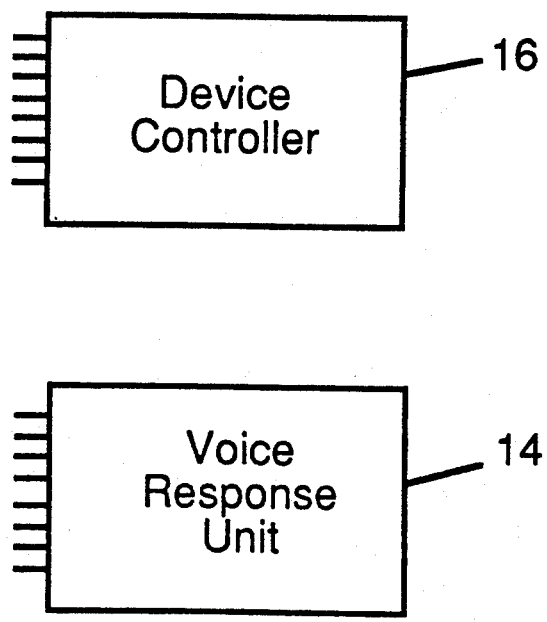
Figure 14:
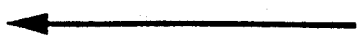
FIG. 14 is a diagram describing the protocol for the call processing illustrated in FIGS. 9-13.
Figure 14:
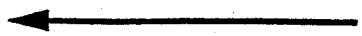
Figure 14:
Figure 14:
Figure 14:
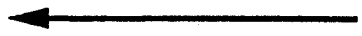
Figure 14:
Figure 14:
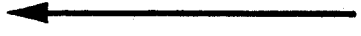
Figure 14:
Figure 14:
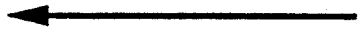
Figure 14:
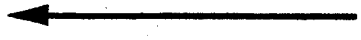
Figure 14:
Figure 14:
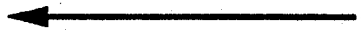
Figure 14:
Figure 14:
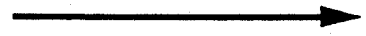
Figure 14:

FIG. 13 shows the result. Caller 44 is now connected to the destination of the outgoing call, and neither device controller 16 nor voice response unit 14 has anything to do with the call.

Other Embodiments

Other embodiments of the invention are within the scope of the following claims.

For example, in addition to voice response units, other call handling devices can be used in the practice of the invention. Also, instead of having the voice response unit initiate a transfer of a call (by sending the announcement done message), the device controller could initiate a transfer (e.g., as soon as an agent becomes available). In addition to the public telephone network, private networks can be used. Also, in addition to ISDN and analog shared call appearances, there can be ISDN and ISDN shared call appearances and ISDN and T-1 shared call appearances where available. With private networks, the shared call appearances can be between proprietary PBX sets and between those sets and other types of lines (analog, ISDN, and T-1), where supported.

Also, other forms of voice and data call connection interfaces can be used in place of analog lines 18 and ISDN line 20 for connecting the call handling device and the device controller to the network so long as certain requirements are met for the call connection interfaces. Each of the interfaces must permit establishing and releasing a network connection and participation with another call connection interface in the same network connection. Also, the interface for the device controller must additionally permit either control over a network connection when the interface is the sole interface participating in that connection or control over the network connection to drop the last leg added to a connection.

Figure 15:
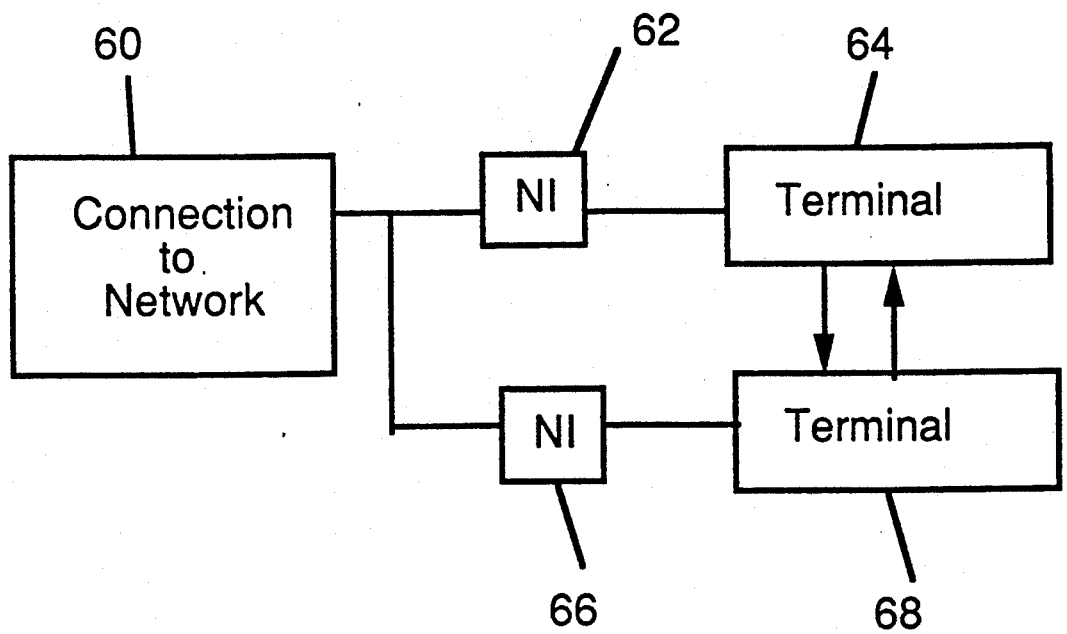
FIG. 15 is a diagram of a system including two terminal devices connected to the same network connection.
Figure 16:
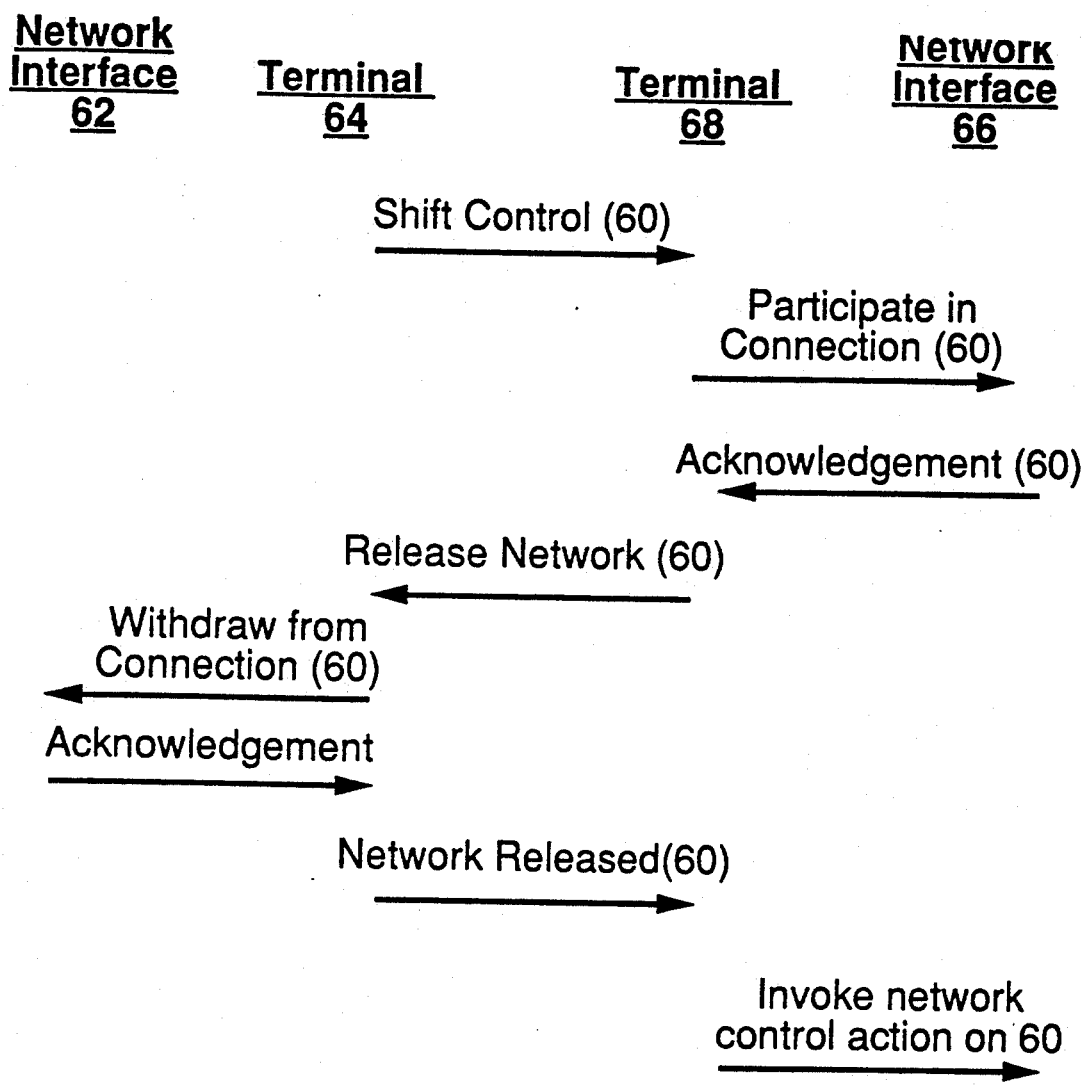
FIG. 16 is a diagram describing a protocol used to shift control of the network connection from one terminal device to the other in the FIG. 15 system.

The invention provides a means to shift control of a connection from one network interface to another by making use of message exchange between the devices attached to the network. Referring to FIG. 15, connection to network 60 is shown connected via network interface 62 to terminal 64 and via network interface 66 to terminal 68. FIG. 16 shows the steps in the protocol providing shift of connection control for connection 60. At the start of the protocol diagram, network connection 60 is present only at network interface 62, and network interface 62 has control of connection 60. To initiate the shift in control, terminal 64 sends a "shift control" message to terminal 68, identifying connection 60 as the connection to be moved. Terminal 68 then commands network interface 66 to participate in the specified connection. When a network action has been successfully performed, terminal 68 sends a "release network" message to terminal 64 identifying connection 60 to be released. Terminal 64 then commands network interface 62 to withdraw from connection 60. When this network action has been successfully performed, terminal 64 returns a "network released" message to terminal 68 informing terminal 68 that network interface 66 now has control of connection 60. Now terminal 68 can perform any network control action supported by its feature set. A "request control" message could proceed the entire message exchange if terminal 68 were to initiate the shift of control.

This method of shifting control of a network connection is employed in the method described above in FIGS. 4–8. The "announcement done" message corresponds to the "shift control" message; the "hang up" message corresponds to the "release network" message, and the "acknowledgment" message corresponds to the "network released" message.

Figure 17:
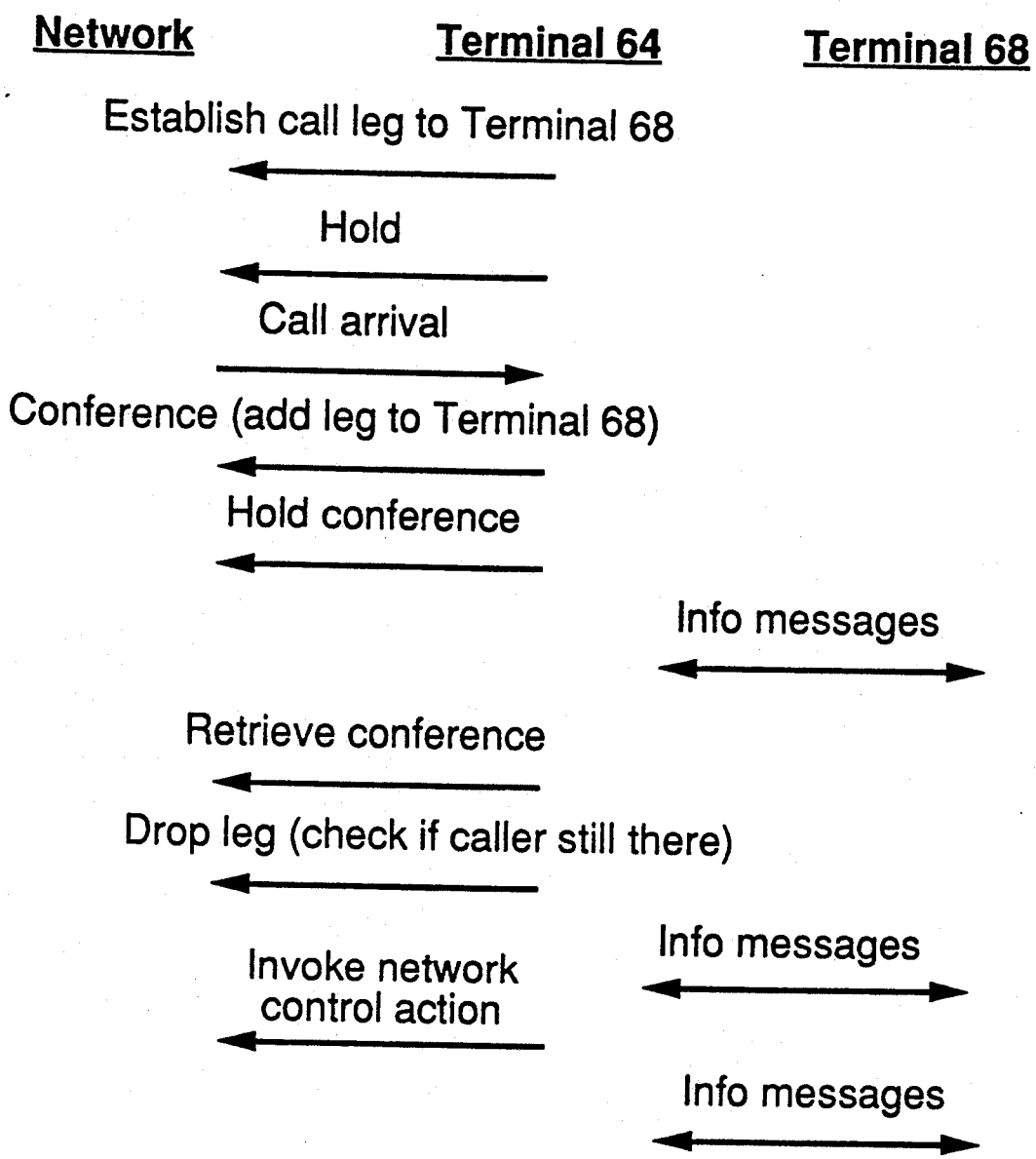
FIG. 17 is a diagram describing a protocol used to monitor the state of the network connection in the FIG. 15 system.

The invention also provides a means to monitor and control the state of a network connection from a network interface that is not participating in the connection. FIG. 17 describes a protocol for this to take place. It is similar to the FIG. 14 protocol, except that the specific messages have been replaced with "info messages" on FIG. 17, and the "transfer" command has been replaced with "invoke network control action". In carrying out the method, the Drop command is used to monitor the state of the network connection. After the leg to terminal 68 has been disconnected, terminal 64 is the sole terminal at the connection.

What is claimed is:

1. A control system for processing a call over a network comprising a call handling device connected to said network via first call connection interface, said first call connection interface permitting establishing and releasing a network connection to said call over said network and participation with a second call connection interface in said network connection to said call over said network, said call handling device being programmed to receive control messages over message transfer interfaces and being capable of actively engaging said call over said first call connection interface, and a device controller connected to said network via said second call connection interface, said second call connection interface permitting establishing and releasing said network connection to said call over said network, participation with said first call connection interface in said network connection to said call over said network, and control over said network connection when said second call connection interface is the sole interface participating in said network connection to said call over said network, said device controller being connected to said call handling device via said message transfer interfaces and being programmed to provide a control message to said call handling device regarding at least one of establishing and releasing said network connection.

2. The system of claim 1 wherein said call handling device is programmed to send informational messages to said device controller via said message transfer interfaces.

3. The system of claim 2 wherein said first and second call connection interfaces provide said participation via a shared call appearance.

4. The system of claim 2 wherein said informational messages include a message that provides information as to call handling activity that is lacing from information provided by participation in said network connection.

5. The system of claim 2 wherein said call handling device is a voice response unit, and said informational messages include a message that provides information received from a call.

6. The system of claim 1 wherein said first and second call connection interfaces provide said participation via a shared call appearance.

7. The system of claim 1 wherein said second call connection permits a first call connection control function that said first call connection interface does not have or does not perform efficiently.

8. The system of claim 7 wherein said first call handling function is call transfer.

9. The system of claim 8 wherein said control message is a message to disengage said call, and wherein said device controller includes means to generate signals to transfer said call after said call handling device has disengaged said call.

10. The system of claim 9 wherein said call handling device is programmed to send informational messages to said device controller via said message transfer interfaces, said call handling device is a voice response unit, and said informational messages include a message that provides information received from the caller.

11. The system of claim 9 wherein said first call connection interface is to an analog line.

12. The system of claim 11 wherein said second call connection interface is to an ISDN line.

13. The system of claim 9 wherein said first call connection interface is to a T1 line.

14. The system of claim 13 wherein said second call connection interface is to an ISDN line.

15. The system of claim 1 wherein said call handling device and said device controller are implemented on the same platform, and said message transfer interfaces are internal.

16. The system of claim 1 wherein said call handling device and said device controller are implemented on different platforms.

17. The system of claim 12 further comprising a direct communication link between said call handling device and said device controller, and wherein said message transfer interfaces are to said direct communication link.

18. The system of claim 16 wherein said message transfer interfaces are to a network that is different from the network to which said call handling device and said device controller are connected via said first and second call connection interface.

19. The system of claim 16 wherein said message transfer interfaces are to a network that is the same as the network to which said call handling device and said device controller are connected via said first and second call connection interfaces.

20. The system of claim 1 wherein said network is a public telephone network.

21. The system of claim 1 wherein said network is a private network.

22. The system of claim 1 wherein said network is a PBX network.

23. The system of claim 1 wherein said network is a data network.

24. A method for processing a call over a network comprising providing a call handling device that is attached to said network via a first call connection interface, said first call connection interface permitting establishing and releasing a network connection to said call over said network and participation with a second call connection interface in said network connection to said call over said network, providing a device controller connected to said network via said second call connection interface, said second call connection interface permitting establishing and releasing said network connection to said call over said network, participation with said first call connection interface in said network connection to said call over said network, and control over said network connection when said second call connection interface is the sole interface participating in said connection to said call over said network, receiving said call at said network connection in which both said call handling device and said device controller participate, actively engaging said call by said call handling device, and transmitting a control message regarding at least one of establishing and releasing said network connection from said device controller to said call handling device via message transfer interfaces.

25. The method of claim 24 further comprising disengaging said call by said call handling device after said transmitting.

26. The method of claim 25 further comprising transferring said call to another call connection by said device controller after said disengaging.

27. The method of claim 26 wherein said call handling device is a voice response unit, and said actively engaging includes obtaining information from a caller making said call and further comprising transmitting to said device controller an informational message that includes information received from said caller.

28. The method of claim 27 wherein said control message instructs said call handling device to disengage said call after said actively engaging by said device controller, and further comprising transmitting an informational message from said call handling device to said device controller indicating that said call handling device has disengaged said call after it has disengaged said call.

29. The method of claim 24 wherein said network is a public telephone network.

30. The method of claim 24 wherein said network is a private network.

31. The method of claim 24 wherein said network is a PBX network.

32. The method of claim 24 wherein said network is a data network.

33. A control system for processing a call over a network comprising:
  a call handling device connected to said network via a first call connection interface, said first call connection interface permitting establishing and releasing a network connection to said call over said network and participation with a second call connection interface in said network connection to said call over said network, said call handling device being programmed to do at least one of sending and receiving messages over message transfer interfaces and being capable of actively engaging said call over said first call connection interface, said call handling device and said call being connected to said network via respective legs, one of said legs being added to said network connection before the other leg, and
  a device controller connected to said network via said second call connection interface, said second call connection interface permitting establishing and releasing said network connection to said call over said network, participation with said first call connection interface in said network connection to said call over said network, and control over said network connection to drop the leg that was added last to said network connection,
  said device controller being connected to said call handling device via message transfer interfaces and being programmed to do at least one of sending or receiving messages over said message transfer interfaces, said device controller also being programmed to provide a drop message to said network to drop the last leg added to said network connection.

34. The system of claim 33 wherein said device controller is programmed to place itself on hold while said call handling device actively engages said call.

35. The system of claim 34 wherein said call handling device is a voice response unit.

36. The system of claim 33 wherein said call handling device is programmed to send informational messages to said device controller via said message transfer interfaces.

37. The system of claim 33 wherein said first and second call connection interfaces provide said participation via conferencing.

38. The system of claim 37 wherein said device controller is programmed to determine the state of said network connection by examining the state of the network that results after sending a drop message to the network to drop the leg added to a conference.

39. The system of claim 33 wherein said second call connection interface permits a first call handling function that said first call connection interface does not have or does not perform efficiently.

40. The system of claim 39 wherein said first call handling function is call transfer, and wherein said device controller includes means to generate signals to transfer said call.

41. The system of claim 40 wherein said first call connection interface is to an analog line.

42. The system of claim 41 wherein said second call connection interface is to an ISDN line.

43. The system of claim 40 wherein said first call connection interface is to a T1 line.

44. The system of claim 43 wherein said second call connection interface is to an ISDN line.

45. The system of claim 33 wherein said device and said controller are implemented on the same platform, and said message transfer interfaces are internal.

46. The system of claim 33 wherein said device and said controller are implemented on different platforms.

47. The system of claim 46 further comprising a direct communication link between said call handling device and said device controller, and wherein said message transfer interfaces are to said direct communication link.

48. The system of claim 46 wherein said message transfer interfaces are to a network that is different from the network to which said call handling device and said device controller are connected via said first and second call connection interfaces.

49. The system of claim 46 wherein said message transfer interfaces are to a network that is the same as the network to which said call handling device and said device controller are connected via said first and second call connection interfaces.

50. The system of claim 33 wherein said network is a public telephone network.

51. The system of claim 33 wherein said network is a private network.

52. The system of claim 33 wherein said network is a PBX network.

53. The system of claim 33 wherein said network is a data network.

54. A method for processing a call over a network comprising
  providing a call handling device that is attached to said network via a first call connection interface, said first call connection interface permitting establishing and releasing a network connection to said call over said network and participation with a second call connection interface in said network connection to said call over said network,
  providing a device controller connected to said network via said second call connection interface, said second call connection interface permitting establishing and releasing said network connection to said call over said network, participation with said first call connection interface in said network connection to said call over said network, and control over said network connection to drop the leg that was added last to said network connection,
  receiving said call at a network connection in which both said call handling device and said device controller participate, actively engaging said call by said call handling device over said first call connection interface, said call handling device and said call being connected to said network via respective legs, one of said legs being added to said network connection before the other leg, transmitting a message between said device controller and said call handling device via message transfer interfaces, and 55. The method of claim 54 further comprising placing said device controller on hold during said actively engaging by said call handling device.

56. The method of claim 55 wherein said call handling device is a voice response unit, and wherein said transmitting a message is transmitting an informational message from said call handling device to said device controller via said message transfer interfaces.

57. The method of claim 54 wherein said first and second call connection interfaces provide said participation via conferencing.

58. The method of claim 57 wherein said device controller is programmed to determine the state of said network connection by sending a drop message to the network to drop the last leg added to a conference.

59. The method of claim 54 wherein said second call connection interface permits a first call handling function that said first call connection interface does not have or does not perform efficiently.

60. The system of claim 59 wherein said first call handling function is call transfer, and further comprising generating signals by said device controller to transfer said call.

61. The method of claim 54 wherein said network is a public telephone network.

62. The method of claim 54 wherein said network is a private network.

63. The method of claim 54 wherein said network is a PBX network.

64. The method of claim 54 wherein said network is a data network.

65. A system for shifting control of a network connection from one network interface to a network to another comprising a first terminal device connected to said network via a first network interface, said first network interface permitting establishing and releasing said network connection, participation with a second network interface in said network connection, and control over said network connection when said first network interface is the sole network interface participating in said network connection, said first terminal device being programmed to carry out at least one of transmit and receiving control messages relating to said network connection over message transfer interfaces, and a second terminal device connected to said network via said second network interface, said second network interface permitting establishing and releasing said network connection, participation with said first network interface in said network connection, and control over said network connection when said second network interface is the sole network interface participating in said network connection, said second terminal device being connected to said first terminal device via message transfer interfaces and being programmed to carry out at least one of transmitting and receiving control messages relating to said network connection over said message transfer interfaces.

66. The system of claim 65 wherein said first and second network interfaces provide said participation via a shared call appearance.

67. The system of claim 65 wherein said first terminal device is programmed to establish said network connection, to transmit a control message to said second terminal device to instruct said second terminal device to participate in said network connection, and to thereafter release said network connection.

68. The system of claim 67 wherein said first terminal device is programmed to send a message to said second terminal device stating that it has released the network connection after releasing said network connection.

69. The system of claim 65 wherein said second terminal device is programmed to establish a connection to participate in the said network connection to which said first terminal device is already connected, and to thereafter transmit a control message to said first terminal device to instruct said first terminal device to release said network connection.

70. The system of claim 65 wherein said network is a public telephone network.

71. The system of claim 65 wherein said network is a private network.

72. The system of claim 65 wherein said network is a PBX network.

73. The system of claim 65 wherein said network is a data network.

74. A method for shifting control of a network connection from one network interface to a network to another comprising providing a first terminal device connected to said network via a first network interface, said first network interface permitting establishing and releasing said network connection, participation with a second network interface in said network connection, and control over said network connection when said first network interface is the sole network interface participating in said network connection, providing a second terminal device connected to said network via said second network interface, said second network interface permitting establishing and releasing said network connection, participation with said first network interface in said network connection, and control over said network connection when said second network interface is the sole network interface participating in said network connection, establishing a network connection to said network by said first terminal device via said first network interface, sending a control message relating to said network connection from one said first and second terminal device to the other of said first and second terminal devices over message transfer interfaces, establishing a connection to said network connection by said second terminal device via said second network interface to participate in said call connection with said first terminal device, and releasing said network connection by said first terminal device.

75. The method of claim 74 wherein said first and second network interfaces participate in said network connection via a shared call appearance.

76. The method of claim 74 wherein said sending is sending a control message from said first terminal device to said second terminal device to shift control from said first terminal device to said second terminal device.

77. The method of claim 74 wherein said sending is sending a control message from said second terminal device to said first terminal device to shift control from said first terminal device to said second terminal device.

78. The method of claim 74 further comprising sending a message from said first terminal device to said second terminal device stating that it has released the network connection after said releasing said network connection.

79. The method of claim 74 wherein said network is a public telephone network.

80. The method of claim 74 wherein said network is a private network.

81. The method of claim 74 wherein said network is a PBX network.

82. The method of claim 74 wherein said network is a data network.

83. A system for monitoring the state of a network connection to a network from a network interface comprising a first terminal device connected to said network via a first network interface, said first network interface permitting establishing and releasing said network connection and participation with a second network interface in said network connection, and a second terminal device connected to said network via said second network interface, said second network interface permitting establishing and releasing said network connection and participation with said first network interface in said network connection, said first terminal device being connected to said network connection via a first leg, said network connection having a second leg over said network associated therewith, one of said legs being added before the other leg, said second interface permitting control over said network connection to drop the leg that was added last to said network connection, said second terminal device being programmed to determine the state of said network connection by examining the state of the network that results after sending a drop message to the network to drop the leg that was added last to said network connection.

84. The system of claim 83 wherein said first and second network interfaces provide said participation via conferencing.

85. The method of claim 83 wherein said first and second terminal devices are connected to each other via message transfer interfaces and are programmed to send and receive messages over said message transfer interfaces.

86. The system of claim 83 wherein said second terminal device is programmed to place itself on hold while said first terminal device actively engages said network connection.

87. The system of claim 83 wherein said network is a public telephone network.

88. The system of claim 83 wherein said network is a private network.

89. The system of claim 83 wherein said network is a PBX network.

90. The system of claim 83 wherein said network is a data network.

91. A method for monitoring the state of a network connection to a network from a network interface comprising providing a first terminal device connected to said network via a first network interface, said first network interface permitting establishing and releasing said network connection and participation with a second network interface in said network connection, providing a second terminal device connected to said network via said second network interface, said second network interface permitting establishing and releasing said network connection and participation with said first network interface in said network connection, said first terminal device being connected to said network connection via a first leg, said network connection having a second leg over said network associated therewith, one of said legs being added before the other leg, said second interface permitting control over said network connection to drop the leg that was added last to said network connection, participating in said network connection to said network by said first and second terminal devices, and determining the state of said network connection by said second terminal device by examining the state of the network that results after sending a drop message to the network to drop the leg added last to said network connection.

92. The method of claim 91 wherein said participating is via conferencing.

93. The method of claim 91 further comprising sending messages between said first and second terminal devices via message transfer interfaces.

94. The method of claim 91 further comprising placing said second terminal device on hold while said first terminal device actively engages said network connection.

95. The method of claim 91 wherein said network is a public telephone network.

96. The method of claim 91 wherein said network is a private network.

97. The method of claim 91 wherein said network is a PBX network.

98. The method of claim 91 wherein said network is a data network.

* * * * *

UNITED STATES PATENT AND TRADEMARK OFFICE
CERTIFICATE OF CORRECTION

PATENT NO.  : 5,333,133

DATED       : July 26, 1994

INVENTOR(S) : G. Wayne Andrews et al

It is certified that error appears in the above-identified patent and that said Letters Patent is hereby corrected as shown below:

On title page, item [56]

Under OTHER PUBLICATIONS, the following reference should be listed:   --Voicetek Corporation, "VoiceTek Corporation: Product Overview--

Col. 9, line 33, "lacing" should be --lacking--.

Col. 10, line 6, "claim 12" should be --claim 16--.

Col. 12, line 2, insert --that was-- after "leg" and insert --last-- after "added".

Col. 13, line 9, insert --providing a drop message from said device controller to said network to drop the last leg added to said network connection.-- at the end of the line.

Signed and Sealed this

Thirteenth Day of August, 1996

*Attest:*

BRUCE LEHMAN

*Attesting Officer*          Commissioner of Patents and Trademarks